(12) United States Patent
Lal (10) Patent No.: US 7,874,000 B1
(45) Date of Patent: Jan. 18, 2011

(54) REDUCING FALSE POSITIVES GENERATED BY A DATABASE INTRUSION DETECTION SYSTEM

(75) Inventor: Amrish Lal, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 1822 days.

(21) Appl. No.: 10/994,849

(22) Filed: Nov. 22, 2004

(51) Int. Cl.
*G06F 11/00* (2006.01)
*G06F 12/14* (2006.01)
*G06F 12/16* (2006.01)
*G08B 23/00* (2006.01)

(52) U.S. Cl. .................................. 726/23; 726/25
(58) Field of Classification Search .................. 726/22, 726/23, 24, 25
See application file for complete search history.

(56) References Cited

U.S. PATENT DOCUMENTS

| | | | |
|---|---|---|---|
| 6,088,803 A | 7/2000 | Tso et al. | |
| 6,314,409 B2 | 11/2001 | Schneck | |
| 6,405,318 B1 * | 6/2002 | Rowland | 726/22 |
| 6,473,695 B1 * | 10/2002 | Chutov et al. | 702/2 |
| 6,487,204 B1 * | 11/2002 | Dacier et al. | 370/395.2 |
| 6,671,811 B1 * | 12/2003 | Diep et al. | 726/23 |
| 6,792,456 B1 * | 9/2004 | Hellerstein et al. | 709/224 |
| 6,928,553 B2 | 8/2005 | Xiong et al. | |
| 7,065,534 B2 * | 6/2006 | Folting et al. | 1/1 |
| 7,069,259 B2 * | 6/2006 | Horvitz et al. | 706/25 |
| 7,080,322 B2 * | 7/2006 | Abbott et al. | 715/744 |
| 7,085,780 B2 * | 8/2006 | Sakamoto et al. | 1/1 |
| 7,085,928 B1 * | 8/2006 | Schmid et al. | 713/164 |
| 7,158,022 B2 * | 1/2007 | Fallon | 340/506 |
| 7,181,768 B1 * | 2/2007 | Ghosh et al. | 726/23 |
| 7,221,945 B2 * | 5/2007 | Milford et al. | 455/452.1 |
| 7,234,168 B2 * | 6/2007 | Gupta et al. | 726/25 |
| 7,240,027 B2 * | 7/2007 | McConnell et al. | 705/28 |
| 7,266,088 B1 * | 9/2007 | Virgin | 370/252 |
| 7,278,160 B2 * | 10/2007 | Black et al. | 726/23 |
| 7,290,283 B2 * | 10/2007 | Copeland, III | 726/25 |
| 7,308,715 B2 * | 12/2007 | Gupta et al. | 726/23 |
| 7,363,656 B2 * | 4/2008 | Weber et al. | 726/23 |
| 7,389,430 B2 * | 6/2008 | Baffes et al. | 713/168 |

(Continued)

FOREIGN PATENT DOCUMENTS

WO    WO 01/71499 A1    9/2001

OTHER PUBLICATIONS

Cannady, J., & Harrell, J.R. (1996). A Comparative Analysis of Current Intrusion Detection Technologies. Proceedings of Technology in Information Security Conference (TISC) '96, 212-218.*

(Continued)

*Primary Examiner*—David Garcia Cervetti
(74) *Attorney, Agent, or Firm*—Fenwick & West LLP (57) ABSTRACT

A false positive reduction manager reduces false positives generated by database intrusion detection systems. In one embodiment, the false positive reduction manager monitors attempted database activities executed by a plurality of users. The false positive reduction manager detects at least one attempt by at least one user to execute suspicious database activity, and determines whether the at least one attempt to execute suspicious database activity is legitimate responsive to whether a threshold of users in the same group as the at least one user attempt substantially similar suspicious database activity.

26 Claims, 3 Drawing Sheets

U.S. PATENT DOCUMENTS

| | | | |
|---|---|---|---|
| 7,461,404 B2* | 12/2008 | Dudfield et al. | 726/25 |
| 7,463,590 B2* | 12/2008 | Mualem et al. | 370/241 |
| 2001/0049690 A1* | 12/2001 | McConnell et al. | 707/104.1 |
| 2002/0083343 A1 | 6/2002 | Crosbie | |
| 2002/0087289 A1* | 7/2002 | Halabieh | 702/181 |
| 2002/0087882 A1 | 7/2002 | Schneier et al. | |
| 2002/0157020 A1 | 10/2002 | Royer | |
| 2002/0194490 A1* | 12/2002 | Halperin et al. | 713/200 |
| 2003/0037251 A1 | 2/2003 | Frieder | |
| 2003/0051026 A1 | 3/2003 | Carter et al. | |
| 2003/0126003 A1* | 7/2003 | vom Scheidt et al. | 705/8 |
| 2004/0002932 A1* | 1/2004 | Horvitz et al. | 706/46 |
| 2004/0003279 A1* | 1/2004 | Beilinson et al. | 713/200 |
| 2004/0024736 A1* | 2/2004 | Sakamoto et al. | 707/1 |
| 2004/0088386 A1* | 5/2004 | Aggarwal | 709/220 |
| 2004/0088403 A1* | 5/2004 | Aggarwal | 709/224 |
| 2004/0088404 A1* | 5/2004 | Aggarwal | 709/224 |
| 2004/0088405 A1* | 5/2004 | Aggarwal | 709/224 |
| 2004/0111632 A1* | 6/2004 | Halperin | 713/200 |
| 2004/0111645 A1* | 6/2004 | Baffes et al. | 713/202 |
| 2004/0199576 A1* | 10/2004 | Tan | 709/203 |
| 2004/0199791 A1* | 10/2004 | Poletto et al. | 713/201 |
| 2004/0199792 A1* | 10/2004 | Tan et al. | 713/201 |
| 2004/0199793 A1* | 10/2004 | Wilken et al. | 713/201 |
| 2004/0205374 A1* | 10/2004 | Poletto et al. | 714/4 |
| 2004/0215975 A1* | 10/2004 | Dudfield et al. | 713/201 |
| 2004/0220984 A1* | 11/2004 | Dudfield et al. | 708/200 |
| 2004/0221190 A1* | 11/2004 | Roletto et al. | 714/4 |
| 2004/0250134 A1* | 12/2004 | Kohler et al. | 713/201 |
| 2004/0261030 A1* | 12/2004 | Nazzal | 715/738 |
| 2005/0018618 A1* | 1/2005 | Mualem et al. | 370/252 |
| 2005/0033989 A1* | 2/2005 | Poletto et al. | 713/201 |
| 2005/0203836 A1* | 9/2005 | Woodward et al. | 705/39 |
| 2005/0288883 A1* | 12/2005 | Folting et al. | 702/102 |
| 2006/0173992 A1* | 8/2006 | Weber et al. | 709/224 |
| 2008/0216164 A1* | 9/2008 | Baffes et al. | 726/8 |

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference on Enterprise Information Systems, vol. 1, Apr. 3-6, 2002, pp. 121-128, Ciudad Real, Spain.

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>.

AirCERT web page, last updated Sep. 18, 2000 [online]. Cert.org [retrieved Apr. 18, 2003]. Retrieved from the Internet: <URL: http://www.cert.org/kb/aircert/>.

Analysis Console for Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>.

Web page, announcing Nov. 11, 2000 release of Dshield [online]. Deja.com [retrieved Apr. 18, 2003]. Retrieved from the Internet: > URL: http://groups.google.com/groups?selm=8vm48v%245pd%241%40nnrp1.deja.com&oe=UTF-8&output=gplain>.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>.

MyNetWatchman.com web pages indicating 9/00 beta release [online]. MyNetWatchman.com [retrieved Apr. 18, 2003]. Retrieved from the Internet: <URL: http://www.mynetwatchman.com/mynetwatchman/relnotes.htm>.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic." [online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P. Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet: <URL: http://www.nsc.cz/index.php?language=en&menuitem=0&subitem=4&subitem=13>, 3 pages, Czech Republic.

"SSL Stripper Installation Guide," [online]. Retrieved in Mar. 2005 from the Internet: <URL: http://www.sslstripper.com>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?I...>, 2 pages.

Webwasher AG/Webwasher 1000 CSM Appliance, "Webwasher 1000 CSM Appliance," [online]. Retrieved on Mar. 18, 2005. Retrieved from the Internet: <URL: http://www.webwasher.com/enterprise/products/webwasher_production/csm_appliance/index...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1,page.

Webwasher AG/Webwasher Anti Virus, "Webwasher Anti Virus," [online]. Retrieved on March 18, 2005. Retrieved from the Internet: <URL: http://www.webwasher.com/enterprise/products/webwasher_products/anti_virus/index.html...>, 2 pages.

Webwasher AG/Webwasher Anti Spam, "Webwasher Anti Spam," [online]. Retrieved on Mar. 18, 2005. Retrieved from the Internet:

<URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

REDUCING FALSE POSITIVES GENERATED BY A DATABASE INTRUSION DETECTION SYSTEM

TECHNICAL FIELD

This invention pertains generally to computer security, and more specifically to reducing false positives generated by database intrusion detection systems.

BACKGROUND

A Database Intrusion Detection System (DIDS) attempts to detect intrusion attempts being made against a database system. A DIDS, in general, operates in two modes: 1) the learning mode and 2) the operational mode.

In the learning mode, a DIDS continuously examines how a database is being accessed and used over a period of time. Based on this examination, the DIDS develops a profile of what constitutes normal activity on the database.

In the operational mode, the DIDS monitors all database activity by examining all access attempts, queries, etc. on the database system. The DIDS compares attempted database activity to the profile of normal activity for the database built by the DIDS during the training mode. Through this process, the DIDS can determine whether the attempted database activity is normal or not. If a database activity is normal, the DIDS does not take any action. However, if the database activity is abnormal (or anomalous), the DIDS typically sends an alert message notifying an administrator about the abnormal activity.

Intrusions detection systems (including any DIDS) in general can produce a large number of alert messages, including some that are erroneously produced by legitimate activity. Such alert messages are commonly known as false-positives.

Additionally, it is not realistic to expect that activity on a database system will remain constant. As business conditions or employee workloads change, the activity of a database system is likely to change.

Whenever there is a change in legitimate activity of a database system due to a change in business conditions (for example end-of-quarter or end-of-year account closing activity) or employee workload, a DIDS will likely start generating false positives.

Under such a situation a DIDS looses much of its value. First, it becomes difficult to determine whether the alert messages are due to legitimate or illegitimate activity. Second, there is no restraint mechanism in DIDS's to account for alert messages that are due to legitimate activity (false positives).

What is needed are computer implemented methods, computer readable media and computer systems for reducing false positives generated by database intrusion detection systems, and for enabling retraining of a DIDS as changes in legitimate database activity occur.

DISCLOSURE OF INVENTION

Computer-implemented methods, computer systems and computer-readable media reduce false positives generated by database intrusion detection systems. In one embodiment, a false positive reduction manager monitors attempted database activities executed by a plurality of users. The false positive reduction manager detects at least one attempt by at least one user to execute suspicious database activity, and determines whether the attempt to execute suspicious database activity is legitimate responsive to whether a threshold of users in the same group attempt substantially similar suspicious database activity.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
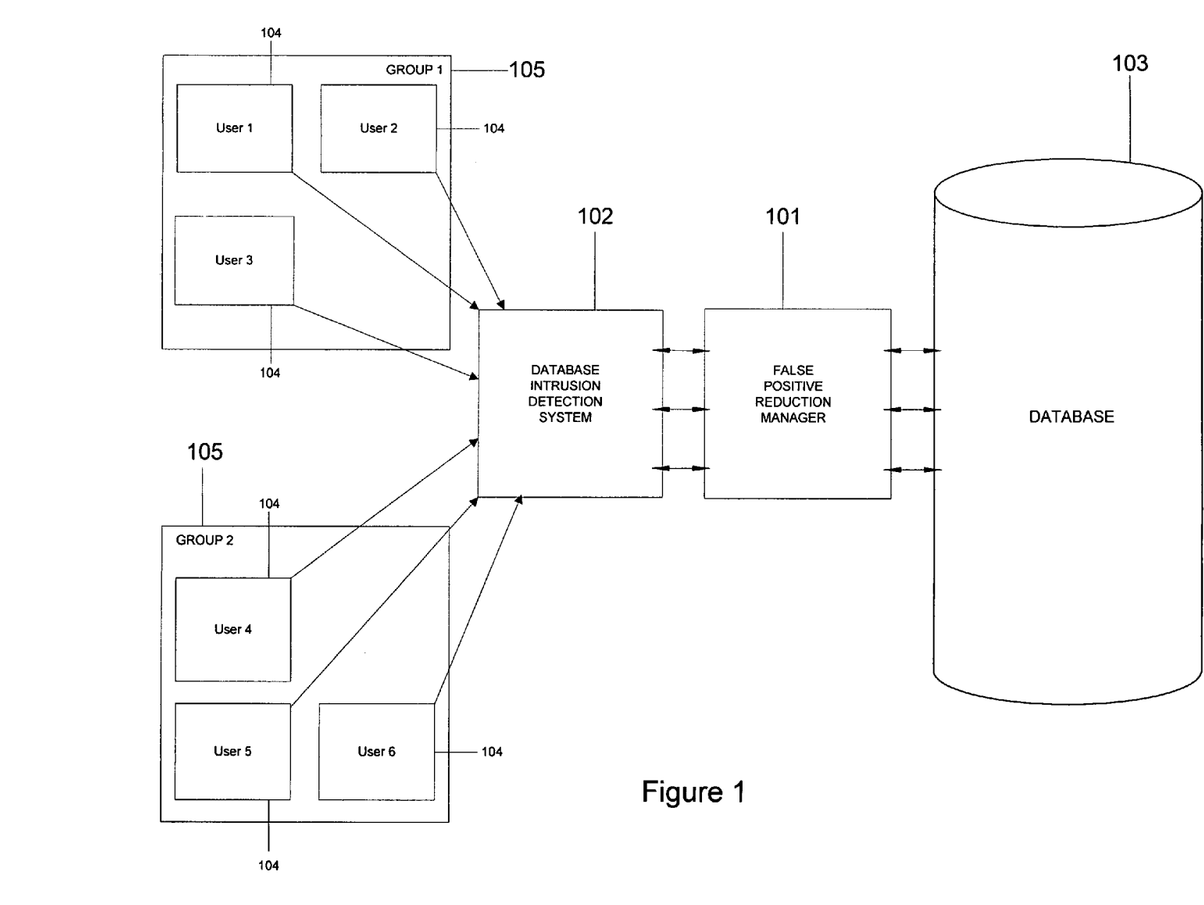
FIG. 1 is a block diagram illustrating a high level overview of a system for practicing some embodiments of the present invention.

FIG. 1 illustrates a high level overview of a system 100 for practicing some embodiments of the present invention. A false positive reduction manager 101 reduces the generation of false positives by a database intrusion detection system (DIDS) 102. It is to be understood that although the false positive reduction manager 101 is illustrated as a single entity, as the term is used herein, a false positive reduction manager 101 refers to a collection of functionalities which can be implemented as software, hardware, firmware or any combination of these. In one embodiment, a false positive reduction manager 101 is implemented as executable computer program instructions tangibly embodied on a computer-readable storage medium. Where a false positive reduction manager 101 is implemented as software, it can be implemented as a standalone program, but can also be implemented in other ways, for example as part of a larger program, as a plurality of separate programs, as one or more device drivers or as one or more statically or dynamically linked libraries.

As illustrated in FIG. 1, the false positive reduction manager 101 monitors attempted database 103 activities executed by a plurality of users 104. During the course of monitoring the users 104, the false positive reduction manager 101 detects attempts by users 104 to execute suspicious database 103 activity. It is to be understood that the monitoring of users 104 and initial detecting of suspicious activity can be according to any DIDS 102 system, for example a DEMIDS system. The implementation mechanics of monitoring users 104 and detecting suspicious activity according to a DIDS 102 methodology within the context of the present invention will be readily apparent to those of ordinary skill in the relevant art in light of this specification.

The false positive reduction manager 101 determines whether an attempt to execute suspicious database 103 activity is legitimate, responsive to whether a threshold of users 104 in the same group 105 as the user 104 attempting the suspicious database 103 activity attempt substantially similar suspicious database 103 activity. In database 103 systems, users 104 are placed into groups 105 for administrative purposes. Users 104 who need to execute similar database 103 activity are placed in a common group 105. Permissions and access levels assigned to the group 105 then determine what database 103 resources and objects the users 104 of the group 105 can access. Examples of possible groups 105 in a database 103 system are sales, accounting and development.

False positives generated by a user's 104 suspicious but legitimate database 103 requests can be significantly reduced by determining whether other users 104 in the same group 105 are also making similar requests. If a substantial percentage of the users 104 in the group 105 are making similar requests, then it is likely that a legitimate change in the business and/or activity workload of the group 105 has changed. An example of a legitimate change in a group's 105 business activity is account-keeping activities occurring at the end of a quarter or fiscal year. Legitimate change in employee workload could occur, for example, due to project reassignment.

Thus, responsive to a threshold of users 104 in the same group 105 as the user 104 that made the suspicious request attempting substantially similar suspicious database 103 activity, the false positive reduction manager 101 determines that the attempt to execute suspicious database 103 activity is legitimate. On the other hand, responsive to a threshold of users 104 in the same group 105 as the user 104 not attempting substantially similar suspicious database 103 activity, the false positive reduction manager 101 determines that the attempt to execute suspicious database 103 activity is not legitimate.

It is to be understood that what constitutes a threshold of users 104 in the same group 105 is a variable design parameter that can be adjusted up or down as desired. In some embodiments of the present invention, the false positive reduction manager 101 calculates a threshold as a percentage of the number of users 104 in the group 105. In other embodiments, a threshold can be a specific number, a range, etc.

In some embodiments, the false positive reduction manager 101 uses a default value (for example, a default percentage) as the threshold. In other embodiments, the false positive reduction manager 101 receives a threshold value from an administrator. In either case, in some embodiments an administrator can modify the threshold value to be used, as desired. Additionally, how close database 103 requests need to be in order to be considered substantially similar is also a variable design parameter.

Change in business activity or workload can be temporary (ranging from a few hours to a few days) or permanent. Therefore, in some embodiments of the present invention, the false positive reduction manager 101 determines whether attempts to execute suspicious database 103 activity are legitimate responsive to whether a threshold of users 104 in the same group 105 attempt substantially similar suspicious database 103 activity within a defined period of time. Of course, the value of the defined period of time is a variable design parameter that can be adjusted up or down as desired.

Figure 2:
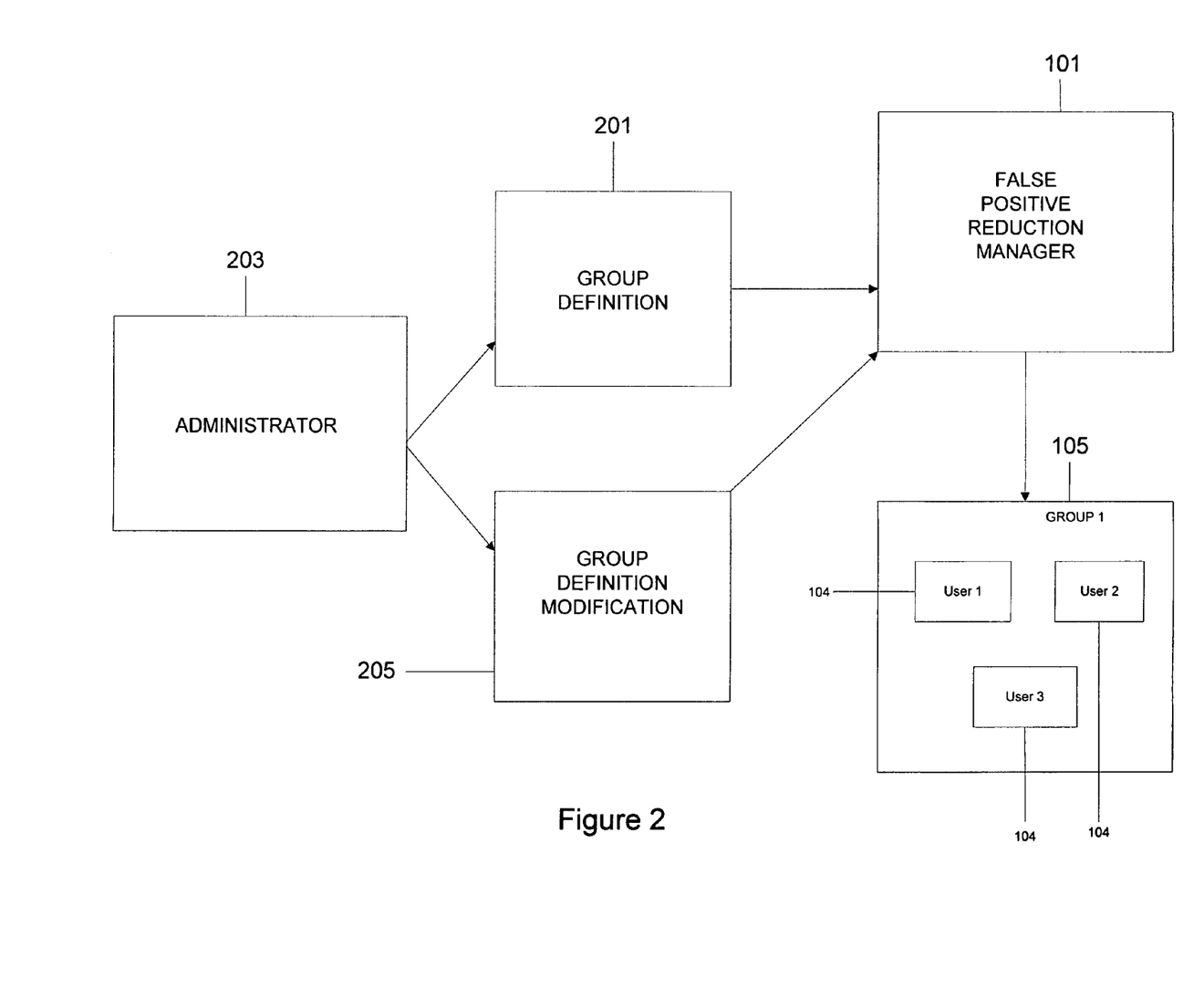
FIG. 2 is a block diagram illustrating the false positive reduction manager receiving group definitions from an administrator, according to some embodiments of the present invention.

In some embodiments of the present invention, at least some of the groups 105 utilized by the false positive reduction manager 101 are a function of the database 103 which is being monitored (e.g., a sales group). However, as illustrated in FIG. 2, in some embodiments of the present invention, definitions 201 of at least some of the groups 105 utilized by the false positive reduction manager 101 are received from an administrator 203. The administrator 203 can define groups 105 of users 104 as desired, and submit these definitions 201 to the false positive reduction manager 101. Additionally, the administrator 203 can modify these definitions 201 as desired, submitting the modifications 205 to the false positive reduction manager 101, which updates the corresponding group 105 definitions 201 accordingly.

Figure 3:
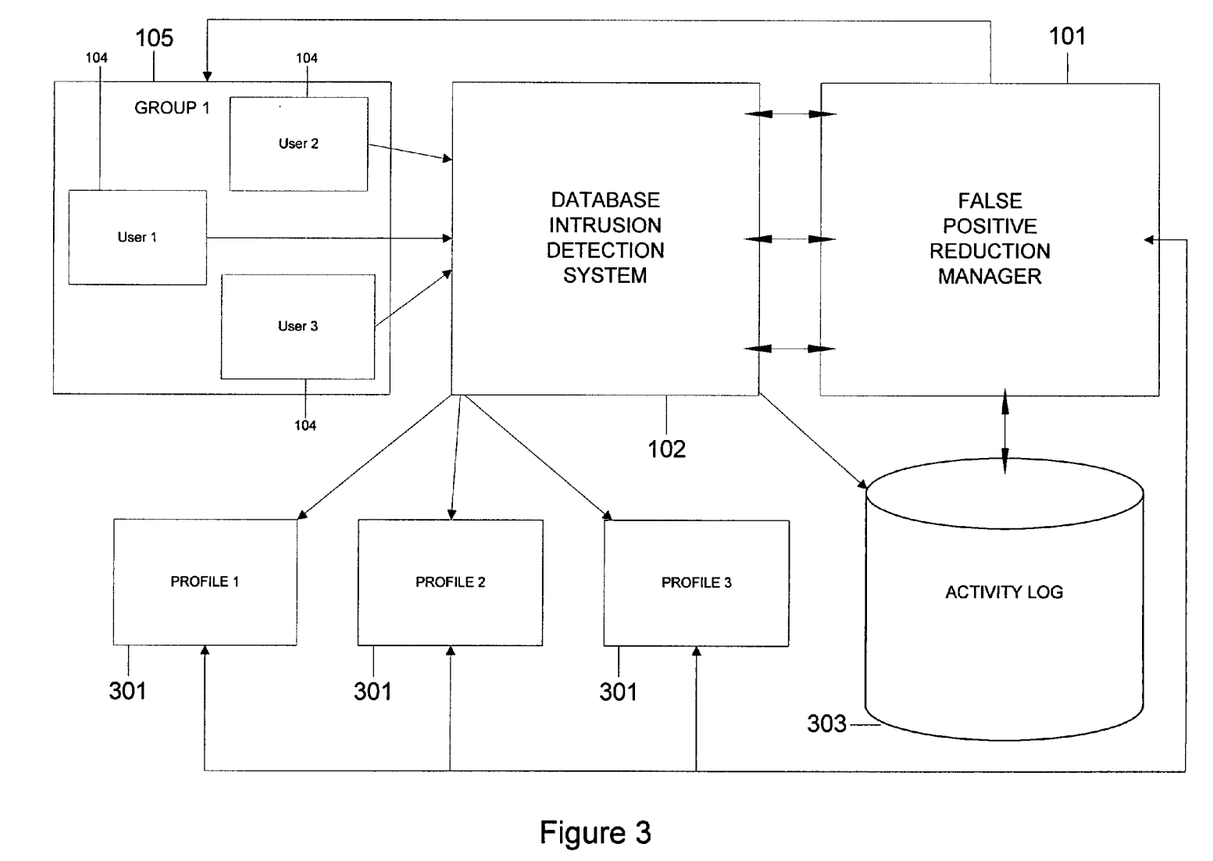
FIG. 3 is a block diagram illustrating the false positive reduction manager initiating retraining of the DIDS, and generating group definitions, according to some embodiments of the present invention.

Turning now to FIG. 3, in some embodiments of the present invention, the false positive reduction manager 101 can initiate retraining of the DIDS 102 if substantially similar suspicious database 103 requests continue to be executed by members of the same group 105 for a given amount of time. In such a case, the false positive reduction manager 101 assumes that workload has permanently shifted. Thus, this functionality can initiate DIDS 102 retraining when a legitimate change in business activity or employee workload occurs.

In such an embodiment, as illustrated in FIG. 3, responsive to a threshold of users in a same group attempting substantially similar suspicious database 103 activity for a defined period of time, the false positive reduction manager 101 initiates execution of a new DIDS 102 learning mode.

Additionally, in some embodiments of the present invention, groups 105 are defined by the false positive reduction manager 101 during the DIDS 102 learning mode. In such embodiments, the false positive reduction manager 101 analyzes database 103 activity attempted by a plurality of users 104 during learning mode. Responsive to attempted activity, a profile 301 is created for each user 104 of the plurality, as part of the DIDS 102 learning mode. Responsive to the DIDS 102 creating a substantially similar profile 301 for at least one subset of the users 104 of the plurality, the false positive reduction manager 101 defines those users 104 as being members of a group 105.

In other embodiments, groups 105 are defined by the false positive reduction manager 101 during the DIDS 102 learning mode by analyzing a database 103 activity log 303. Responsive to the contents of the log 303, a profile 301 is created for each of a plurality of users. Responsive to the DIDS 102 creating a substantially similar profile 301 for at least one subset of the users 104 of the plurality, the false positive reduction manager 101 defines those users 104 as being members of a group 105.

As will be apparent to those of ordinary skill in the relevant art in light of this specification, the methodology described herein can also be applied in intrusion detection systems other than a DIDS. For example, some embodiments of the present invention can be instantiated in conjunction with intrusion detection systems such as (but not limited to) web application servers, Enterprise Resource Planning systems and Enterprise Resource Management systems, among others.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for reducing false positives generated by a database intrusion detection system, the method comprising the steps of:
    monitoring, by a computer comprising a processor and memory, attempted database activities executed by a plurality of users;
    detecting at least one attempt by at least one user to execute suspicious database activity; and
    responsive to a threshold amount of users in a same group as the at least one user attempting substantially similar suspicious database activity, determining that the at least one attempt to execute suspicious database activity is legitimate.

2. The method of claim 1 further comprising:
    responsive to a threshold amount of users in a same group as the at least one user not attempting substantially similar suspicious database activity, determining that the attempt to execute suspicious database activity is not legitimate.

3. The method of claim 1 wherein determining that the at least one attempt to execute suspicious database activity is legitimate further comprises:
    determining that the at least one attempt to execute suspicious database activity is legitimate responsive to a threshold amount of users in a same group as the at least one user attempting substantially similar suspicious database activity within a defined period of time.

4. The method of claim 1 further comprising:
    examining at least one group definition that is a function of the database to determine whether users attempting substantially similar suspicious database activity are in a same group.

5. The method of claim 1 further comprising:
    receiving at least one group definition from an administrator; and
    examining at least one received group definition to determine whether users attempting substantially similar suspicious database activity are in a same group.

6. The method of claim 1 further comprising:
    receiving at least one modification to at least one group definition from an administrator;
    responsive to the at least one received modification, modifying the at least one group definition; and
    examining at least one modified group definition to determine whether users attempting substantially similar suspicious database activity are in a same group.

7. The method of claim 1 further comprising:
    during a database intrusion detection system learning mode, analyzing database activity attempted by a plurality of users;
    responsive to attempted activity, creating a profile for each user of the plurality as part of the database intrusion detection system learning mode;
    responsive to creating a substantially similar profile for at least one subset of the users of the plurality, defining those users as being members of a group; and
    examining at least one defined group to determine whether users attempting substantially similar suspicious database activity are in a same group.

8. The method of claim 1 further comprising:
    during a database intrusion detection system learning mode, analyzing a database activity log;
    responsive to contents of the log, creating a profile for each of a plurality of users as part of the database intrusion detection system learning mode;
    responsive to creating a substantially similar profile for at least one subset of the users of the plurality, defining those users as being members of a group; and
    examining at least one defined group to determine whether users attempting substantially similar suspicious database activity are in a same group.

9. The method of claim 1 further comprising:
    calculating a value to use as a threshold amount of users in a same group as a percentage of total users in that group; and
    using the calculated threshold amount in the legitimacy determination of the at least one attempt to execute suspicious database activity.

10. The method of claim 1 further comprising:
    receiving a value to use as a threshold amount of users in a same group from an administrator; and
    using the received threshold amount in the legitimacy determination of the at least one attempt to execute suspicious database activity.

11. The method of claim 1 further comprising:
    receiving at least one modification to a value to use as a threshold amount of users in a same group from an administrator;
    responsive to the at least one received modification, modifying the threshold amount; and
    using the modified threshold amount in the legitimacy determination of the at least one attempt to execute suspicious database activity.

12. The method of claim 1 further comprising:
    using a default value as a threshold amount in the legitimacy determination of the at least one attempt to execute suspicious database activity.

13. The method of claim 1 further comprising:
    responsive to a threshold amount of users in a same group attempting substantially similar suspicious database activity for a defined period of time, initiating execution of a new database intrusion detection system learning mode.

14. A computer readable storage medium having executable computer program instructions tangibly embodied thereon for reducing false positives generated by a database intrusion detection system, the executable computer program instructions comprising:
    computer program instructions for monitoring attempted database activities executed by a plurality of users;
    computer program instructions for detecting at least one attempt by at least one user to execute suspicious database activity; and
    computer program instruction for determining that the at least one attempt to execute suspicious database activity is legitimate responsive to a threshold amount of users in a same group as the at least one user attempting substantially similar suspicious database activity.

15. The computer readable storage medium of claim 14, wherein the executable computer program instructions further comprise:
   computer program instructions for determining that the attempt to execute suspicious database activity is not legitimate responsive to a threshold amount of users in a same group as the at least one user not attempting substantially similar suspicious database activity.

16. The computer readable storage medium of claim 14 wherein the computer program instructions for determining that the at least one attempt to execute suspicious database activity is further comprises:
   computer program instructions for determining that the at least one attempt to execute suspicious database activity is legitimate responsive to a threshold amount of users in a same group as the at least one user attempting substantially similar suspicious database activity within a defined period of time.

17. The computer readable storage medium of claim 14, wherein the executable computer program instructions further comprise:
   computer program instructions for analyzing database activity attempted by a plurality of users during a database intrusion detection system learning mode;
   computer program instructions for creating a profile for each user of the plurality as part of the database intrusion detection system learning mode responsive to attempted activity;
   computer program instructions for defining those users as being members of a group responsive to creating a substantially similar profile for at least one subset of the users of the plurality; and
   computer program instructions for examining at least one defined group to determine whether users attempting substantially similar suspicious database activity are in a same group.

18. The computer readable storage medium of claim 14, wherein the executable computer program instructions further comprise:
   computer program instructions for analyzing a database activity log during a database intrusion detection system learning mode;
   computer program instructions for creating a profile for each of a plurality of users as part of the database intrusion detection system learning mode responsive to contents of the log;
   computer program instructions for defining those users as being members of a group responsive to creating a substantially similar profile for at least one subset of the users of the plurality; and
   computer program instructions for examining at least one defined group to determine whether users attempting substantially similar suspicious database activity are in a same group.

19. The computer readable storage medium of claim 14, wherein the executable computer program instructions further comprise:
   program code for initiating execution of a new database intrusion detection system learning mode responsive to a threshold amount of users in a same group attempting substantially similar suspicious database activity for a defined period of time.

20. A computer system for reducing false positives generated by a database intrusion detection system, the computer system comprising:
   a computer-readable storage medium having executable computer program instructions tangibly embodied thereon, the executable computer program instructions comprising:
      a software portion configured to monitor attempted database activities executed by a plurality of users;
      a software portion configured to detect at least one attempt by at least one user to execute suspicious database activity; and
      a software portion configured to determine that the at least one attempt to execute suspicious database activity is legitimate responsive to a threshold amount of users in a same group as the at least one user attempting substantially similar suspicious database activity.

21. The computer system of claim 20 wherein the executable computer program instructions further comprises:
   a software portion configured to determine that the attempt to execute suspicious database activity is not legitimate responsive to a threshold amount of users in a same group as the at least one user not attempting substantially similar suspicious database activity.

22. The computer system of claim 20 wherein the software portion configured to determine further comprises:
   a software portion configured to determine that the at least one attempt to execute suspicious database activity is legitimate responsive to a threshold amount of users in a same group as the at least one user attempting substantially similar suspicious database activity within a defined period of time.

23. The computer system of claim 20 wherein the executable computer program instructions further comprises:
   a software portion configured to analyze database activity attempted by a plurality of users during a database intrusion detection system learning mode;
   a software portion configured to create a profile for each user of the plurality as part of the database intrusion detection system learning mode responsive to attempted activity;
   a software portion configured to define those users as being members of a group responsive to creating a substantially similar profile for at least one subset of the users of the plurality; and
   a software portion configured to examine at least one defined group to determine whether users attempting substantially similar suspicious database activity are in a same group.

24. The computer system of claim 20 wherein the executable computer program instructions further comprises:
   a software portion configured to analyze a database activity log during a database intrusion detection system learning mode;
   a software portion configured to create a profile for each of a plurality of users as part of the database intrusion detection system learning mode responsive to contents of the log;
   a software portion configured to define those users as being members of a group responsive to creating a substantially similar profile for at least one subset of the users of the plurality; and
   a software portion configured to examine at least one defined group to determine whether users attempting substantially similar suspicious database activity are in a same group.

25. The computer system of claim 20 wherein the executable computer program instructions further comprises:
   a software portion configured to initiate execution of a new database intrusion detection system learning mode responsive to a threshold amount of users in a same group attempting substantially similar suspicious database activity for a defined period of time.

26. A computer implemented method for reducing false positives generated by an intrusion detection system, the method comprising the steps of:

monitoring, by a computer comprising a processor and memory, attempted system activities executed by a plurality of users;

detecting at least one attempt by at least one user to execute suspicious system activity;

identifying a subgroup of users in a same group as the at least one user attempting substantially similar suspicious system activity, the subgroup excluding the at least one user;

responsive to a size of the subgroup exceeding a threshold value, determining that the at least one attempt to execute suspicious system activity is legitimate; and responsive to the size of the subgroup exceeding the threshold value for a defined period of time, initiating execution of a new intrusion detection system learning mode.

* * * * *